(12) United States Patent
Kitamura

(10) Patent No.: US 7,836,757 B2
(45) Date of Patent: Nov. 23, 2010

(54) PHASE FEEDBACK AFM AND CONTROL METHOD THEREFOR

(75) Inventor: Shinichi Kitamura, Saitama (JP)

(73) Assignee: JEOL Ltd., Tokyo (JP)

( * ) Notice: Subject to any disclaimer, the term of this patent is extended or adjusted under 35 U.S.C. 154(b) by 491 days.

(21) Appl. No.: 12/051,362

(22) Filed: Mar. 19, 2008

(65) Prior Publication Data

US 2008/0229813 A1 Sep. 25, 2008

(51) Int. Cl.
*G01B 5/28* (2006.01)
*G01Q 30/06* (2010.01)
*G01Q 60/24* (2010.01)

(52) U.S. Cl. .............................. 73/105; 850/10; 850/11; 850/33

(58) Field of Classification Search .................... 73/105; 850/10, 11, 21, 33
See application file for complete search history.

(56) References Cited

U.S. PATENT DOCUMENTS 6,006,595 A * 12/1999 Kitamura ..................... 73/105
6,941,798 B2 * 9/2005 Yamaoka et al. ............... 73/105
6,983,644 B2 * 1/2006 Yamanaka et al. ............. 73/105
7,387,016 B2 * 6/2008 Nakamoto ..................... 73/105

FOREIGN PATENT DOCUMENTS

JP 2000-346784 12/2000

* cited by examiner

*Primary Examiner*—Daniel S Larkin
(74) *Attorney, Agent, or Firm*—The Webb Law Firm

(57) ABSTRACT

A phase feedback AFM (atomic force microscope) and method for the phase feedback AFM. A cantilever is driven to oscillate at a constant frequency close to the resonance frequency of the cantilever by a driving signal. The distance between the probe and the sample is controlled such that the phase difference between the driving signal and a cantilever deflection signal indicating deflections of the cantilever is kept constant. The phase feedback AFM has an amplifier-controller for receiving the cantilever deflection signal, the output from an oscillator for driving the cantilever into oscillation, and a signal representing a reference amplitude of oscillation of the cantilever. The phase feedback AFM further includes a feedback circuit which receives the output from the amplifier-controller which controls the cantilever deflection signal to a preset amplitude.

2 Claims, 2 Drawing Sheets

PHASE FEEDBACK AFM AND CONTROL METHOD THEREFOR

BACKGROUND OF THE INVENTION

1. Field of the Invention

The present invention relates to a phase feedback AFM (atomic force microscope) and to a control method for the phase feedback AFM. More particularly, the invention relates to a phase feedback AFM capable of maintaining constant the amplitude of the cantilever oscillation by controlling the amplitude of a driving voltage and to a control method for this phase feedback AFM.

2. Description of Related Art

A scanning probe microscope (SPM) is an instrument for imaging the surface of a sample by scanning a probe relative to the sample while the sample is placed close to the probe, producing a local stimulus from the probe to the sample during the scanning, and measuring a local response of the surface of the sample to the stimulus. Many types of SPM, which are different in method of measuring physical amounts, have been put into practical use. The family of scanning probe microscopy (SPM) includes scanning tunneling microscope (STM) for detecting an electrical current flowing between the probe and the sample, atomic force microscope (AFM) for detecting various forces exerted between the sample surface and the probe, and magnetic force microscope (MFM) for measuring the magnetic field distribution on the sample surface. In this way, numerous kinds of microscopes for measuring frictional force, viscosity, elasticity, and electric potential on the sample surface have been put into practical use.

An NC-AFM (non-contact atomic force microscope) is one kind of SPM, and is an instrument for imaging surface topography by detecting a shift in the resonance frequency of the cantilever due to the interaction between the probe and the sample and controlling the probe-sample distance to maintain the shift constant. Some methods are available to detect the resonance frequency of the cantilever. In the FM detection method, the cantilever is vibrated at its resonance frequency, and the resonance frequency is directly detected. In the slope detection method, the resonance frequency is indirectly detected as an amplitude or phase variation. In the slope detection method, amplitude variations are generally used. In contrast, in the present invention, an NC-AFM using phase variations is employed.

FIG. 2 is a diagram showing an example of configuration of a prior art instrument, i.e., an NC-AFM using the slope detection method. The rear surface of a cantilever 1 is irradiated with laser light emitted from a laser diode (LD) 2. The reflected light is detected by a photodetector 3. Vibrational displacements of the cantilever 1 are detected. The detector output is electrically amplified by a preamplifier 4 incorporating a bandpass filter.

Meanwhile, a driving signal is supplied from an oscillator 5 to a driving PZT (piezoelectric transducer) 6. The cantilever 1 is oscillated at the frequency of the driving signal supplied from the oscillator 5. The output signal from the photodetector 3 indicating displacements of the cantilever 1 is applied via the preamplifier 4 to an amplifier-detector 7, which outputs a voltage corresponding to the amplitude. For example, a lock-in amplifier or RMS-DC converter for converting an alternating signal into a direct current of an effective value can be used as the amplifier-detector 7.

The relationship between the gradient F of the force acting between the probe and a sample 17 and the resonance frequency $f_0$ of the cantilever having a spring constant k is given by $$f_0 \propto \sqrt{k-F}$$

The variation in $f_0$ (frequency shift) substantially corresponds to the gradient F. At oscillations at a constant frequency close to the resonance frequency, a variation in the resonance frequency appears as a variation in amplitude.

A signal indicating the amplitude is applied to an error amplifier 8, which, in turn, controls the Z motion of a PZT scanner 11 via a filter 9 and a Z-piezo PZT driver 10 such that the amplitude becomes equal to a preset amplitude (i.e., the output from a reference signal source (Ref. V) 12). The amplitude that would otherwise vary is maintained at a constant value set by the reference signal source 12. The signal (i.e., the output signal from the filter 9) controlling the Z motion at this time represents the topography of the surface. The PZT scanner 11 is scanned in two dimensions by X and Y scan signals 13 X, Y. The Z motion produced at this time is used as a brightness signal. As a result, a topographic image is obtained.

In NC-AFM using such slope detection method, a phase signal may be displayed simultaneously as the variation of the resonance frequency of the cantilever 1. This phase signal is the phase difference between the reference signal from the oscillator 5 and the output signal from the preamplifier 4 indicating displacements of the cantilever 1. Variations in the resonance frequency of the cantilever 1 are more sensitively detected than variations in amplitude. The phase signal is produced by a phase detector 14. For example, a phase comparator is used as the phase detector 14. A highly sensitive phase signal may be used for feedback instead of an amplitude signal. In this case, any one of the output $V_{phase}$ from the phase detector 14 and the output $V_{Amp}$ from the amplifier-detector 7 is selected by a switch SW and applied to the error amplifier 8.

In a known instrument of this kind, feedback control is used for scanning to control the distance between the probe and the sample surface such that the amplitude of oscillation of the probe is kept constant near the resonant frequency of the probe. The resilience is found from the amplitude of vibration of the oscillating probe varying based on modulation of the force acting between the sample and the probe. The viscosity is measured from the phase of the vibration of the probe (see, for example, JP-A-2000-346784 (paragraphs 0017-0021 and FIG. 2)).

In the prior art instrument, the amplitude varies simultaneously with the phase signal when the phase signal is used as a signal for controlling the distance between the probe and the sample. Consequently, there is the problem that the obtained topographic image deviates from the true surface topography by an amount corresponding to the variation in amplitude.

SUMMARY OF THE INVENTION

It is an object of the present invention to provide a phase feedback AFM capable of producing a topographic image indicating the true topography of a sample surface. It is another object of the present invention to provide a control method for this phase feedback AFM.

In one embodiment, the present invention provides a phase feedback AFM (atomic force microscope) in which a cantilever is driven to oscillate at a constant frequency close to the resonance frequency of the cantilever by a driving signal. The distance between a probe and a sample is controlled to maintain constant the phase difference between the driving signal and a cantilever deflection signal indicating deflections of the cantilever. The output from an oscillator is controlled based on (i) the cantilever deflection signal, (ii) the output from the oscillator for driving the cantilever into oscillation, and (iii) a signal representing a reference amplitude of oscillation of the cantilever such that the amplitude of the deflection signal from the oscillating cantilever assumes a preset value.

In another embodiment according to the present invention, the amplitude of oscillation of the cantilever is detected. The amplitude of the driving voltage applied to the cantilever is feedback controlled such that the detected amplitude becomes equal to a preset value. Consequently, the amplitude of oscillation of the cantilever is kept constant. Hence, the topography of the sample surface can be imaged at high sensitivity and accurately.

These and other objects and advantages of the present invention will become more apparent as the following description proceeds.

DETAILED DESCRIPTION OF THE INVENTION

Figure 1:
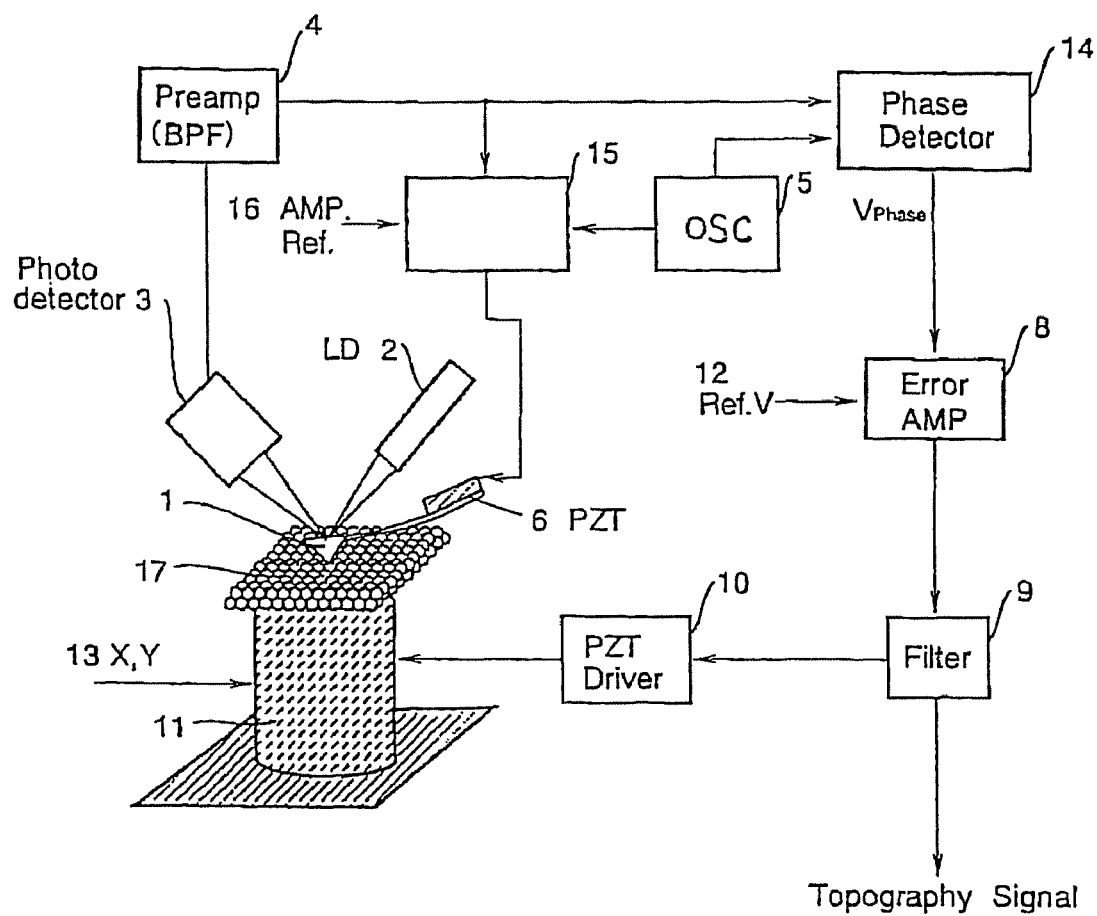
FIG. 1 is a block diagram showing one embodiment of the present invention.
Figure 2:
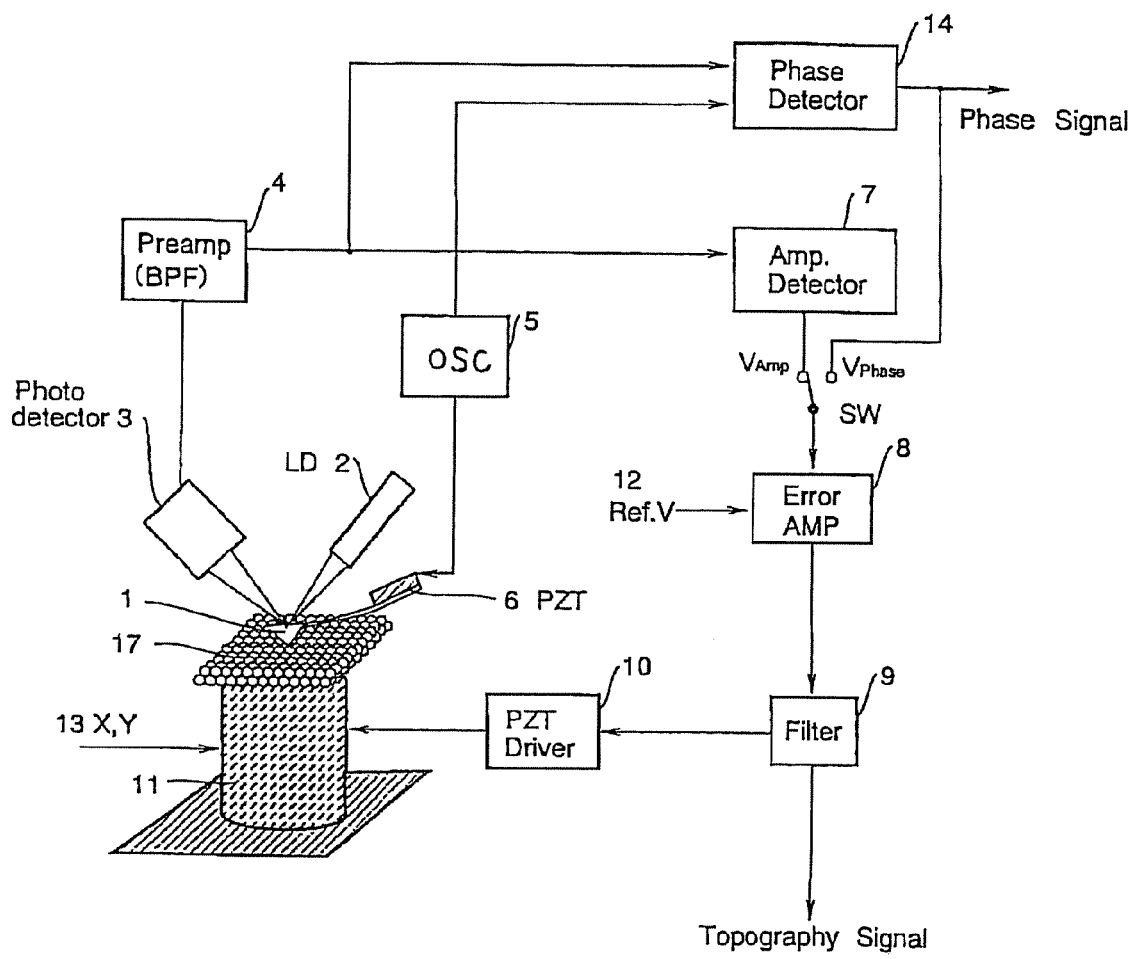
FIG. 2 is a block diagram showing an example of configuration of a prior art instrument.

Embodiments of the present invention are hereinafter described in detail with reference to the drawings. FIG. 1 is a block diagram showing one embodiment of the present invention. In both FIGS. 1 and 2, like components are indicated by like reference numerals. In FIG. 1, a probe (not shown) is attached to the tip of a cantilever 1. The rear surface of the cantilever 1 is irradiated with laser light emitted from a laser diode (LD) 2. Modulated laser light is reflected from the cantilever 1 and hits a photodetector 3, where the light is converted into an electrical signal. The probe is placed over a sample 17. A piezoelectric ceramic transducer (PZT) 6 drives the cantilever 1 which is attached to the PZT 6.

A preamplifier 4 has a bandpass filter (BPF) function for receiving and amplifying the output from the photodetector 3. Indicated by reference numeral 5 is an oscillator. A phase detector 14 has two input terminals. The output from the preamplifier 4 is applied to one of the two input terminals of the phase detector 14. The output from the oscillator 5 is applied to the other input terminal. The phase detector 14 produces the phase difference between the two signals. An error amplifier 8 receives the output, or phase-difference signal, from the phase detector 14 and produces the difference between the output signal from the phase detector 14 and a reference signal (Ref. V) 12. A filter 9 receives the output from the error amplifier 8. A PZT driver 10 receives the output from the filter 9 and controls Z motion of a PZT scanner 11 according to the output signal from the filter 9. An amplifier-controller 15 receives the output from the preamplifier 4 (indicating the deflection signal from the cantilever), the output from the oscillator 5, and a reference signal (Amp. Ref) 16 and outputs an AGC (automatic gain control) signal to oscillate the driving PZT 6. The operation of the instrument constructed in this way is described below.

The cantilever 1 is oscillated by the driving PZT 6. The rear surface of the cantilever 1 is irradiated with laser light emitted from the laser diode 2. The reflected modulated light is detected by the photodetector 3. Vibrational displacements of the cantilever 1 are detected by the photodetector 3 utilizing the optical lever. The displacements are applied to the preamplifier 4 incorporating a bandpass filter (BPF), and are amplified. The output from the preamplifier 4 (modulated driving signal), reference driving signal from the oscillator 5, and the reference signal (DC value of an effective value (such as an RMS value)) (Amp. Ref 16) corresponding to the output from the preamplifier 4 are applied to the amplifier-controller 15.

The amplifier-controller 15 receives the output from the preamplifier 4 and converts it into a DC value, such as an RMS value, and adjusts the amplitude of the signal from the oscillator 5 such that the DC value obtained by the conversion becomes equal to the reference signal Amp. Ref 16. An AGC signal based on the adjusted signal is applied to the driving PZT 6, thus oscillating it. As a result, the output from the preamplifier 4 is held at a value corresponding to the preset amplitude of oscillation of the cantilever 1.

The cantilever deflection signal whose amplitude is controlled to be constant is applied to one input terminal of the phase detector 14 via the preamplifier 4. The output from the oscillator 5 is applied to the other input terminal of the phase detector 14. A signal corresponding to the phase difference between the cantilever deflection signal and the reference signal from the oscillator 5 for the driving signal is output as a phase-difference signal.

The phase-difference signal reflects the gradient of the force exerted between the probe and the sample, and is applied to the error amplifier 8. The reference signal (Ref. V) 12 is applied to the error amplifier 8. A feedback signal is applied to the PZT scanner 11 via the filter 9 and PZT driver 10 such that the difference between the phase-difference signal and the reference signal 12 (Ref. V) becomes equal to zero. Thus, Z motion of the PZT scanner 11 is controlled. At this time, the output signal from the filter 9 controls the Z motion and represents the topography of the surface of the sample. The PZT scanner 11 is scanned in two dimensions by the scan signals (X, Y scan) 13. A topographic signal is obtained by using the resulting Z motion as a brightness signal. The topographic signal is applied to a desired display device or recorder, where the signal is displayed or recorded as a visible image.

When the probe (not shown) at an end of the cantilever 1 is brought close to the sample 17, the apparent resonance frequency of the cantilever 1 is shifted due to the interaction force between the probe and the sample. The frequency shift appears as a variation in the amplitude of the cantilever 1 and as a phase difference between the driving signal and the deflection of the cantilever 1 when it is oscillated at a constant frequency close to the resonance frequency. The X-Y scan signals 13 are supplied to the PZT scanner 11 while controlling the distance between the probe and the sample by a Z-piezo such that the phase difference is maintained constant. The PZT scanner 11 is scanned in two dimensions, or in X- and Y-directions. A topographic image is obtained, using the resulting Z motion as a brightness signal.

If the phase is varied, the amplitude of oscillation of the cantilever 1 will also be varied. Therefore, the amplitude of the driving signal from the oscillator 5 is controlled by the amplifier-controller 15 such that the amplitude of oscillation of the cantilever becomes equal to a value corresponding to the preset reference signal (Amp. Ref) 16. In checking the image obtained by the instrument according to the present invention, the phase variation is gradually increased while watching the image until a required resolution is reached.

According to the present invention, high resolution comparable with FM detection is obtained by the feedback loop (photodetector 3→phase detector 14→error amplifier 8→filter 9→PZT driver 10) using a more sensitive phase signal as a signal for controlling the distance between the probe and the sample. The amplitude of oscillation of the cantilever that would otherwise be varied by phase variation is maintained constant at all times by another feedback loop (photodetector 3→preamplifier 4→amplifier-controller 15→driving PZT 6). Consequently, an accurate topographic image indicating the topography of the surface of a sample is obtained.

Having thus described my invention with the detail and particularity required by the Patent Laws, what is desired protected by Letters Patent is set forth in the following claims.

The invention claimed is:

1. A control method for a phase feedback AFM (atomic force microscope) having a probe, a cantilever possessing a resonance frequency, and an oscillator, said control method comprising the steps of:

driving the cantilever to oscillate at a constant frequency close to the resonance frequency of the cantilever by a driving signal;

controlling the distance between the probe and a sample such that a phase difference between the driving signal and a cantilever deflection signal indicating displacements of the cantilever is kept constant; and controlling an output from the oscillator based on (i) the cantilever deflection signal, (ii) the output from the oscillator for driving the cantilever into oscillation, and (iii) a signal representing a reference amplitude of oscillation of the cantilever so that the amplitude of the cantilever deflection signal assumes a preset value.

2. A phase feedback AFM comprising:

a cantilever having a resonance frequency;

means for driving the cantilever into oscillation at a constant frequency close to the resonance frequency of the cantilever by a driving signal;

means for controlling the distance between a probe and a sample such that a phase difference between the driving signal and a cantilever deflection signal indicating displacements of the cantilever is kept constant; and an amplifier-controller which receives the cantilever deflection signal, an output from an oscillator for driving the cantilever, and a signal representing a reference amplitude of oscillation of the cantilever and which performs given calculations, wherein the amplifier-controller controls the output from the oscillator such that the cantilever deflection signal assumes a preset value.

* * * * *

UNITED STATES PATENT AND TRADEMARK OFFICE
CERTIFICATE OF CORRECTION

PATENT NO. : 7,836,757 B2
APPLICATION NO. : 12/051362
DATED : November 23, 2010
INVENTOR(S) : Kitamura It is certified that error appears in the above-identified patent and that said Letters Patent is hereby corrected as shown below:

Title Page, insert the following:

-- (30)      Foreign Application Priority Data
March 23, 2007      (JP) ..................... 2007-076228 --

Signed and Sealed this
Fifth Day of April, 2011

David J. Kappos
*Director of the United States Patent and Trademark Office*